C. R. FAIREY.
CONTROLLING DEVICE FOR AEROPLANES.
APPLICATION FILED APR. 23, 1919.
1,313,680.
Patented Aug. 19, 1919.
2 SHEETS—SHEET 1.
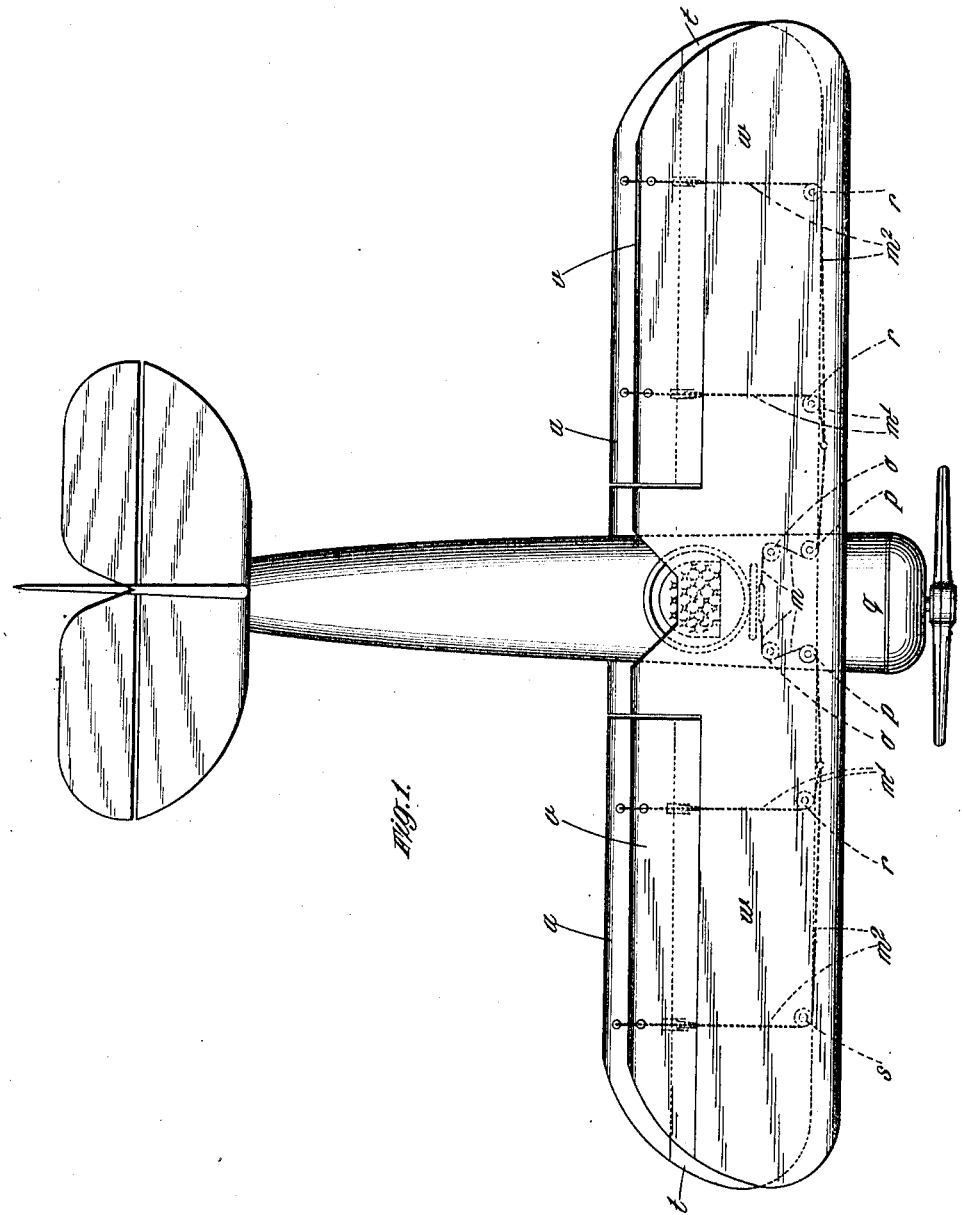

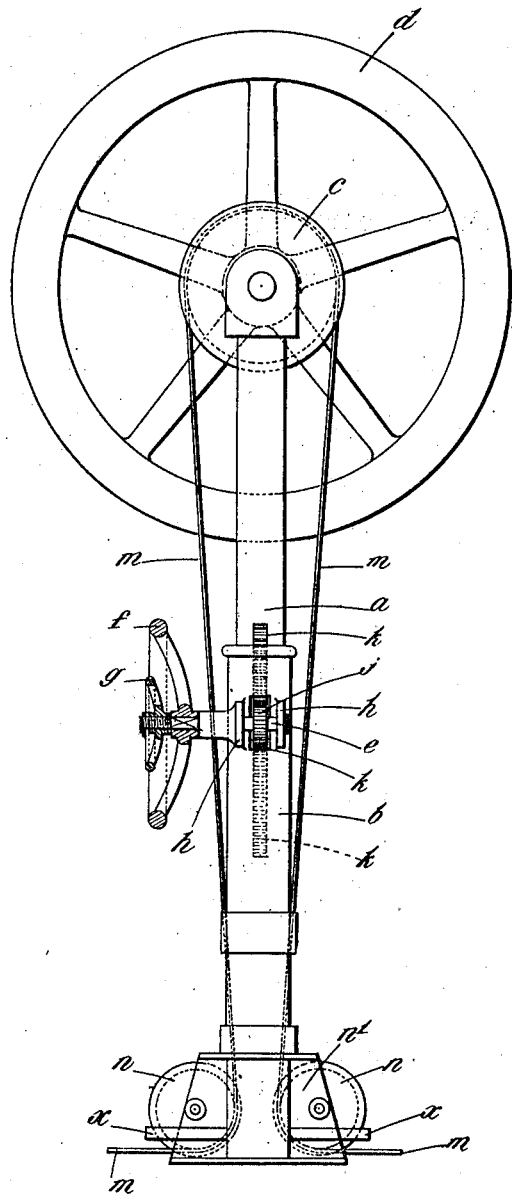
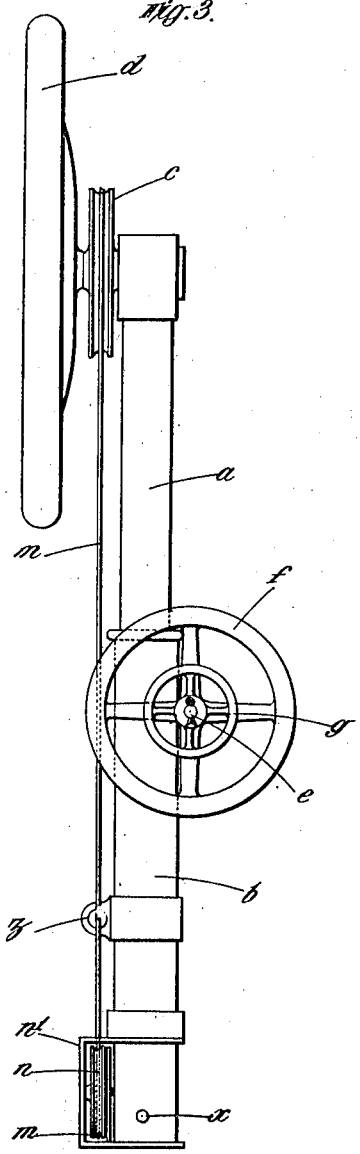

UNITED STATES PATENT OFFICE.

CHARLES RICHARD FAIREY, OF HAYES, ENGLAND.

CONTROLLING DEVICE FOR AEROPLANES.

1,313,680.  Specification of Letters Patent.  Patented Aug. 19, 1919.

Application filed April 23, 1919. Serial No. 292,164.

*To all whom it may concern:*

Be it known that I, CHARLES RICHARD FAIREY, a subject of the King of Great Britain, and formerly resident of Clayton Road, Hayes, in the county of Middlesex, England, but now of Cranford Lane, Hayes, in the county of Middlesex, England, have invented a certain new and useful Improvement in and Relating to Controlling Devices for Aeroplanes, of which the following is a specification.

This invention relates to the means for varying the camber of the wings of an aeroplane when they are so arranged as regards fore and aft section, that part thereof can be hinged or the whole or part thereof can be flexed, and the object of the invention is to provide improved means whereby the camber of both wings may be varied simultaneously in the same direction in such manner as to change the fore and aft sections of said wings, so that the lifting power and efficiency of the machine as a whole can be varied with consequent modification of its speed capacity, yet without interfering with the capability of varying the camber of the respective wings simultaneously in reverse directions, at will, to control lateral stabilization as usual.

The alteration of camber may be effected, for instance, of varying the inclination, relatively to the main portion of a plane, of trailing marginal portions each extending throughout the whole length of a wing, each of such marginal portions forming preferably about one-fourth to one-third of the total chord of the plane, so that any change in the inclination of such marginal portions will produce an effect equivalent to an alteration in both the camber and the angle of incidence either of the plane as a whole, or of the respective wings.

The whole of the trailing marginal portion of each plane of the wings may be hinged after the manner of an aileron or such marginal portion or the whole of each wing may be made flexible with the result, in the latter cases, that the different wing sections obtained are more uniform. The angle through which a wing is varied need not be uniform throughout the whole length of the wing.

It has already been proposed to mount the manually-rotatable drum, upon which is wound the cable (or cables) for varying the cambers of both wings simultaneously but in reverse directions respectively, upon a control-pillar whereof the effective length is variable at will; rotation of the drum causing the camber of one wing to be increased and the camber of the opposite wing to be reduced, whereas alteration in the effective length of the control-pillar will cause the cambers of both wings to be simultaneously altered in the one direction or the other according as the pillar is lengthened or shortened. For this purpose the control-pillar has been made tubular and telescopic, its upper or movable section, which carries the drum and a hand-wheel for rotating the same, being adjusted lengthwise of the lower or stationary section by means of a hand-lever angularly movable over a quadrant whereby to lock the two sections together when the control-pillar, as a whole, has been brought to the desired effective length.

According to the present invention, the adjustment in length of the telescopic control-pillar is effected by means of rack-and-pinion mechanism; the rack being preferably on the upper or movable section of the pillar while the pinion which meshes with said rack turns as one with a spindle adapted to be rotated by a hand-wheel or the like about a substantially horizontal axis extending transversely of the machine.

In the accompanying drawings, wherein Figure 1 is a plan view of an aeroplane provided with controlling means according to this invention, Fig. 2 is a front elevation and Fig. 3 is a side elevation, both on an enlarged scale, of one form of control-pillar constructed in accordance with this invention.

The control-pillar $a\ b$ whereon the drum $c$ with its controlling hand-wheel $d$ is supported, is tubular and telescopic, the drum $c$ being mounted on the upper or slidable portion $a$ of the pillar so as to be rotatable in a vertical plane transverse of the machine, while the lower portion $b$ of the pillar carries a rotatable transverse spindle $e$ controlled by a separate hand-wheel $f$ adapted to be rotated as one therewith and slidable thereon so that it can be locked by a locking wheel $g$ mounted in threaded engagement with the spindle $e$ and adapted to clamp the hand-wheel $f$ against one of the bearings $h\ h$ in which the spindle $e$ is adapted to be rotated. As shown, the hand wheel $f$ fits a square portion of the spindle. The spindle $e$ has fast on it a pinion $j$ in mesh with a rack $k$ on the upper portion $a$ of the pillar through an aperture in said portion, so that by turning the hand-wheel $f$ in one direction or the other the effective length of the control-pillar $a\ b$ will be increased or diminished, the locking-wheel $g$ serving to lock the spindle when the desired length of the control-pillar has been attained.

The respective cables or portions of cable $m\ m$, which extend from the drum $c$ in opposite directions, are led around guide-pulleys $n\ n$ rotatably mounted in a frame $n^1$ at the bottom of the control-pillar $a\ b$ and are thence led around guide-pulleys $o\ o$ and $p\ p$ mounted on the floor of the fuselage $q$ of the machine and are then divided, the separate portions $m^1\ m^1$ and $m^2\ m^2$ leading around guide-pulleys $r\ r$ and $s\ s$ on the lower plane $t$ of the machine to the trailing marginal portions $u\ u$ of the lower plane $t$. The marginal portions $u\ u$ are connected with the trailing marginal portions $v\ v$ of the upper plane $w$ and the marginal portions $u\ v$ of each wing are adapted to be moved as one in opposition to the tension of springs or wind pressure in flight, as is usual. Hence, on the hand-wheel $f$ being turned so as to vary the effective length of the pillar $a\ b$, both of said cables or portions of cable $m\ m$ and the separate portions $m^1\ m^2$ of each will be equally drawn upon or equally relaxed, with the result that the cambers of both wings will be varied simultaneously in the same direction, and the desired wing section obtained.

The pillar $a\ b$ is provided at its foot with a spindle $x$ on which it may be rocked in the fore and aft direction for the actuation of the means for controlling elevation in the usual manner, and for this purpose a lug or bracket $z$ is provided for connection with said means.

It will be evident that an alteration of the camber of both wings in the same direction is equivalent to an alteration in the wing-section, a corresponding change being thus effected in the characteristics of the machine. The higher camber produced by depressing the trailing marginal portions results in an increase of lifting power per unit of surface-area, with a corresponding reduction of necessary supporting speed, which is of great utility in landing; whereas the lower camber produced by raising the trailing marginal portions affords a higher speed-section of plane.

In all cases the hinges for the trailing marginal portions $u\ u$ and $v\ v$ of the wings are such that greater angular movement of said portions relatively to the rest of the wings will be permitted than can be produced by variation in the effective length of the control-pillar, with the result that to whatever extent said portions of both wings may have been moved simultaneously in the same direction, they will still be capable of movement simultaneously in reverse directions under the control of the hand-wheel $d$ and drum $c$. It will be understood that the drum may be replaced by a sprocket wheel adapted to coact with a length of chain to the ends of which the respective control cables are attached.

It will be obvious that the crosshead carrying the drum may be slidably mounted upon a control pillar of fixed length in order that the effective length of said pillar may be varied in accordance with this invention.

I claim:—

In an aeroplane, a telescopic control-pillar having a movable section and a fixed section, said movable section being disposed within said fixed section, a manually-operable drum mounted to rotate upon said movable section, a cable connected with the wings of the aeroplane and wound upon said drum to vary the cambers of both wings simultaneously but in reverse directions respectively, a rack formed on said movable section, bearings on said fixed section, a spindle mounted to rotate in said bearings about a substantially horizontal axis extending transversely of the aeroplane, a portion of said spindle being of rectangular cross section and a portion being screw-threaded, a hand wheel slidable along the portion of rectangular cross section of said spindle, a second hand wheel in threaded engagement with the screw threaded portion of said spindle to force the first mentioned hand wheel against one of said bearings, and a pinion secured to said spindle, said pinion being in mesh with said rack, to vary effective length of said control-pillar.

CHARLES RICHARD FAIREY.